United States Patent
Baghel et al.

(10) Patent No.: US 10,165,574 B2
(45) Date of Patent: Dec. 25, 2018

(54) VEHICLE-TO-EVERYTHING CONTROL CHANNEL DESIGN

(71) Applicant: QUALCOMM Incorporated, San Diego, CA (US)

(72) Inventors: Sudhir Kumar Baghel, Hillsborough, NJ (US); Junyi Li, Chester, NJ (US); Shailesh Patil, San Diego, CA (US); Kapil Gulati, Dover, DE (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/806,661

(22) Filed: Nov. 8, 2017

(65) Prior Publication Data

US 2018/0220410 A1 Aug. 2, 2018

Related U.S. Application Data

(60) Provisional application No. 62/452,954, filed on Jan. 31, 2017.

(51) Int. Cl.
*H04W 72/04* (2009.01)
*H04W 72/14* (2009.01)
(Continued)

(52) U.S. Cl.
CPC ......... *H04W 72/048* (2013.01); *H04L 5/0007* (2013.01); *H04W 72/0406* (2013.01);
(Continued)

(58) Field of Classification Search
CPC ............... H04W 72/048; H04W 72/14; H04W 72/0406; H04W 72/0446; H04W 74/002;
(Continued)

(56) References Cited

U.S. PATENT DOCUMENTS 8,553,713 B2 * 10/2013 Li .......................... H04W 48/16
370/438
9,667,395 B2 * 5/2017 Jongren ................ H04L 5/0051
(Continued)

OTHER PUBLICATIONS

3GPP: "3rd Generation Partnership Project; Technical Specification Group Radio Access Network; Vehicle to Vehicle (V2V) Services based on LTE Sidelink; User Equipment (UE) Radio Transmission and Reception (Release 14)", 3GPP Standard; Technical Report; 3GPP TR 36.785, 3rd Generation Partnership Project (3GPP), Mobile Competence Centre; 650, Route Des Luciales; F-06921 Sophia-Antipolis Cedex; France, vol. RAN WG4, No. V14.0.0, Oct. 12, 2016, XP051295424, [retrieved on Oct. 12, 2016], pp. 1-57.
(Continued)

*Primary Examiner* — Asad M Nawaz
*Assistant Examiner* — Thomas R Cairns
(74) *Attorney, Agent, or Firm* — Holland & Hart LLP

(57) ABSTRACT

Methods, systems, and devices for wireless communication are described. A transmitting device may identify resource blocks (RBs) used to transmit data in a data transmission. The transmitting device may determine a frequency width of a data channel in a frequency domain that is used to transmit the data based at least in part on the identified RBs. The transmitting device may dynamically determine an allocation of RBs used to transmit control information in a control channel. The allocation of RBs may be based on the frequency width of the data channel and may cause a frequency width of the control channel to match the frequency width of the data channel in the frequency domain. The transmitting device may transmit the control information in the control channel to indicate a location of the data channel.

30 Claims, 11 Drawing Sheets

(51) Int. Cl.
*H04L 5/00* (2006.01)
*H04L 29/08* (2006.01)
*H04W 74/00* (2009.01)
*H04W 74/08* (2009.01)

(52) U.S. Cl.
CPC .......... *H04W 72/14* (2013.01); *H04L 5/0053* (2013.01); *H04L 67/12* (2013.01); *H04W 72/0446* (2013.01); *H04W 74/002* (2013.01); *H04W 74/0808* (2013.01)

(58) Field of Classification Search
CPC .. H04W 74/0808; H04L 5/0007; H04L 67/12; H04L 5/0053
See application file for complete search history.

(56) References Cited

U.S. PATENT DOCUMENTS

| | | | |
|---|---|---|---|
| 2011/0263207 A1 | 10/2011 | Tijink et al. | |
| 2016/0295624 A1* | 10/2016 | Novlan | H04W 72/02 |
| 2017/0048905 A1* | 2/2017 | Yun | H04W 76/023 |
| 2017/0078902 A1* | 3/2017 | Matsuo | H04W 72/02 |
| 2017/0164350 A1* | 6/2017 | Sun | H04W 72/0413 |
| 2017/0188391 A1* | 6/2017 | Rajagopal | H04W 74/0816 |
| 2017/0201968 A1* | 7/2017 | Nam | H04W 72/042 |
| 2017/0230996 A1* | 8/2017 | Li | H04W 72/1284 |
| 2017/0289733 A1* | 10/2017 | Rajagopal | H04W 4/005 |
| 2017/0331577 A1* | 11/2017 | Parkvall | H04J 11/0079 |
| 2017/0331670 A1* | 11/2017 | Parkvall | H04J 11/0079 |

OTHER PUBLICATIONS

Intel Corporation: "Details of Resource Pool Design for Sidelink V2V Communication", 3GPP Draft; R1-166515 Intel—V2V Pool, 3rd Generation Partnership Project (3GPP), Mobile Competence Centre; 650, Route Des Lucioles; F-06921 Sophia-Antipolis Cedex; France, vol. RAN WG1, No. Gothenburg, Sweden; Aug. 22-Aug. 26, 2016 Aug. 21, 2016, XP051125411, Retrieved from the Internet: URL:http://www.3gpp.org/ftp/Meetings_3GPP_SYNC/RAN1/Docs/ [retrieved on Aug. 21, 2016], 8 pages.

International Search Report and Written Opinion—PCT/US2018/012994—Mar. 29, 2018.

ZTE: "Scheduling of V2V SPS Resources", 3GPP Draft; R1-166981—7.2.2.4.1 Scheduling of V2V SPS Resource, 3rd Generation Partnership Project (3GPP), Mobile Competence Centre; 650, Route Des Lucioles; F-06921 Sophia-Antipolis Cedex; France, vol. RAN WG1, No. Gothenburg, Sweden; Aug. 22-Aug. 26, 2016 Aug. 21, 2016, XP051125657, Retrieved from the Internet: URL:http://www.3gpp.org/ftp/Meetings_3GPP_SYNC/RAN1/Docs/ [retrieved on Aug. 21, 2016], 4 pages.

* cited by examiner

VEHICLE-TO-EVERYTHING CONTROL CHANNEL DESIGN

CROSS REFERENCES

The present application for patent claims priority to U.S. Provisional Patent Application No. 62/452,954 by Baghel, et al., entitled "Vehicle-to-Everything control Channel Design," filed Jan. 31, 2017, assigned to the assignee hereof.

INTRODUCTION

The following relates generally to wireless communication, and more specifically to vehicle-to-everything control channel design.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

Wireless communication systems may include or support networks used for vehicle based communications, also referred to as vehicle-to-everything (V2X), vehicle-to-vehicle (V2V) networks, and/or cellular V2X (C-V2X) networks. Vehicle based communication networks may provide always-on telematics where UEs, such as vehicle UEs (v-UEs), communicate directly to the network (V2N), to pedestrian UEs (V2P), to infrastructure devices (V21), and to other v-UEs (e.g., via the network). The vehicle based communication networks may support a safe, always-connected driving experience by providing intelligent connectivity where traffic signal/timing, real-time traffic and routing, safety alerts to pedestrians/bicyclist, collision avoidance information, etc., are exchanged.

Such network supporting vehicle based communications, however, may also be associated with various requirements, e.g., communication requirements, security and privacy requirements, etc. Other example requirements may include, but are not limited to, reduced latency requirements, higher reliability requirements, and the like. For example, vehicle-based communications may include communicating sensor data that may support self-driving cars. Sensor data may be used between vehicles to improve the safety of self-driving cars.

SUMMARY

A method of wireless communication is described. The method may include identifying RBs used to transmit data in a data transmission, determining a frequency width of a data channel in a frequency domain that is used to transmit the data based at least in part on the identified RBs, dynamically determining an allocation of RBs used to transmit control information in a control channel, the allocation of RBs based at least in part on the determined frequency width of the data channel, and the allocation of RBs causing a frequency width of the control channel to match the frequency width of the data channel in the frequency domain, and transmitting the control information in the control channel to indicate a location of the data channel.

An apparatus for wireless communication is described. The apparatus may include means for identifying RBs used to transmit data in a data transmission, means for determining a frequency width of a data channel in a frequency domain that is used to transmit the data based at least in part on the identified RBs, means for dynamically determining an allocation of RBs used to transmit control information in a control channel, the allocation of RBs based at least in part on the determined frequency width of the data channel, and the allocation of RBs causing a frequency width of the control channel to match the frequency width of the data channel in the frequency domain, and means for transmitting the control information in the control channel to indicate a location of the data channel.

Another apparatus for wireless communication is described. The apparatus may include a processor, memory in electronic communication with the processor, and instructions stored in the memory. The instructions may be operable to cause the processor to identify RBs used to transmit data in a data transmission, determine a frequency width of a data channel in a frequency domain that is used to transmit the data based at least in part on the identified RBs, dynamically determine an allocation of RBs used to transmit control information in a control channel, the allocation of RBs based at least in part on the determined frequency width of the data channel, and the allocation of RBs causing a frequency width of the control channel to match the frequency width of the data channel in the frequency domain, and transmit the control information in the control channel to indicate a location of the data channel.

A non-transitory computer readable medium for wireless communication is described. The non-transitory computer-readable medium may include instructions operable to cause a processor to identify RBs used to transmit data in a data transmission, determine a frequency width of a data channel in a frequency domain that is used to transmit the data based at least in part on the identified RBs, dynamically determine an allocation of RBs used to transmit control information in a control channel, the allocation of RBs based at least in part on the determined frequency width of the data channel, and the allocation of RBs causing a frequency width of the control channel to match the frequency width of the data channel in the frequency domain, and transmit the control information in the control channel to indicate a location of the data channel.

In some examples of the method, apparatus, and non-transitory computer-readable medium described above, dynamically determining the allocation of RBs further comprises repeating the control channel in the frequency domain.

In some examples of the method, apparatus, and non-transitory computer-readable medium described above, dynamically determining the allocation of RBs further comprises repeating the control channel in time domain.

In some examples of the method, apparatus, and non-transitory computer-readable medium described above, a channel estimation of the control channel is performed based on a Listen Before Talk (LBT) sequence.

Some examples of the method, apparatus, and non-transitory computer-readable medium described above may further include processes, features, means, or instructions for identifying a starting point and a length of the data transmitted in the data transmission. Some examples of the method, apparatus, and non-transitory computer-readable medium described above may further include processes, features, means, or instructions for configuring the control information based at least in part on the starting point and the length of the data.

Some examples of the method, apparatus, and non-transitory computer-readable medium described above may further include processes, features, means, or instructions for identifying a plurality of sub-channels used to transmit the data in the data transmission. Some examples of the method, apparatus, and non-transitory computer-readable medium described above may further include processes, features, means, or instructions for dynamically determining the allocation of RBs used to transmit the control information based at least in part on the plurality of sub-channels.

Some examples of the method, apparatus, and non-transitory computer-readable medium described above may further include processes, features, means, or instructions for determining a number of RBs used to transmit the data transmission, wherein dynamically determining the allocation of RBs used to transmit control information may be based at least in part on the number of RBs used to transmit the data transmission.

In some examples of the method, apparatus, and non-transitory computer-readable medium described above, the allocation of RBs of the control channel comprises allocating a same number of allocated RBs used to transmit control information as a number of identified RBs used to transmit the data.

Some examples of the method, apparatus, and non-transitory computer-readable medium described above may further include processes, features, means, or instructions for transmitting the data in the data channel in conjunction with transmitting the control information in the control channel.

In some examples of the method, apparatus, and non-transitory computer-readable medium described above, the control information comprises information bits configured according to the data transmission.

In some examples of the method, apparatus, and non-transitory computer-readable medium described above, the data transmission comprises a V2X transmission or a vehicle-to-vehicle (V2V) transmission.

DETAILED DESCRIPTION

Figure 1:
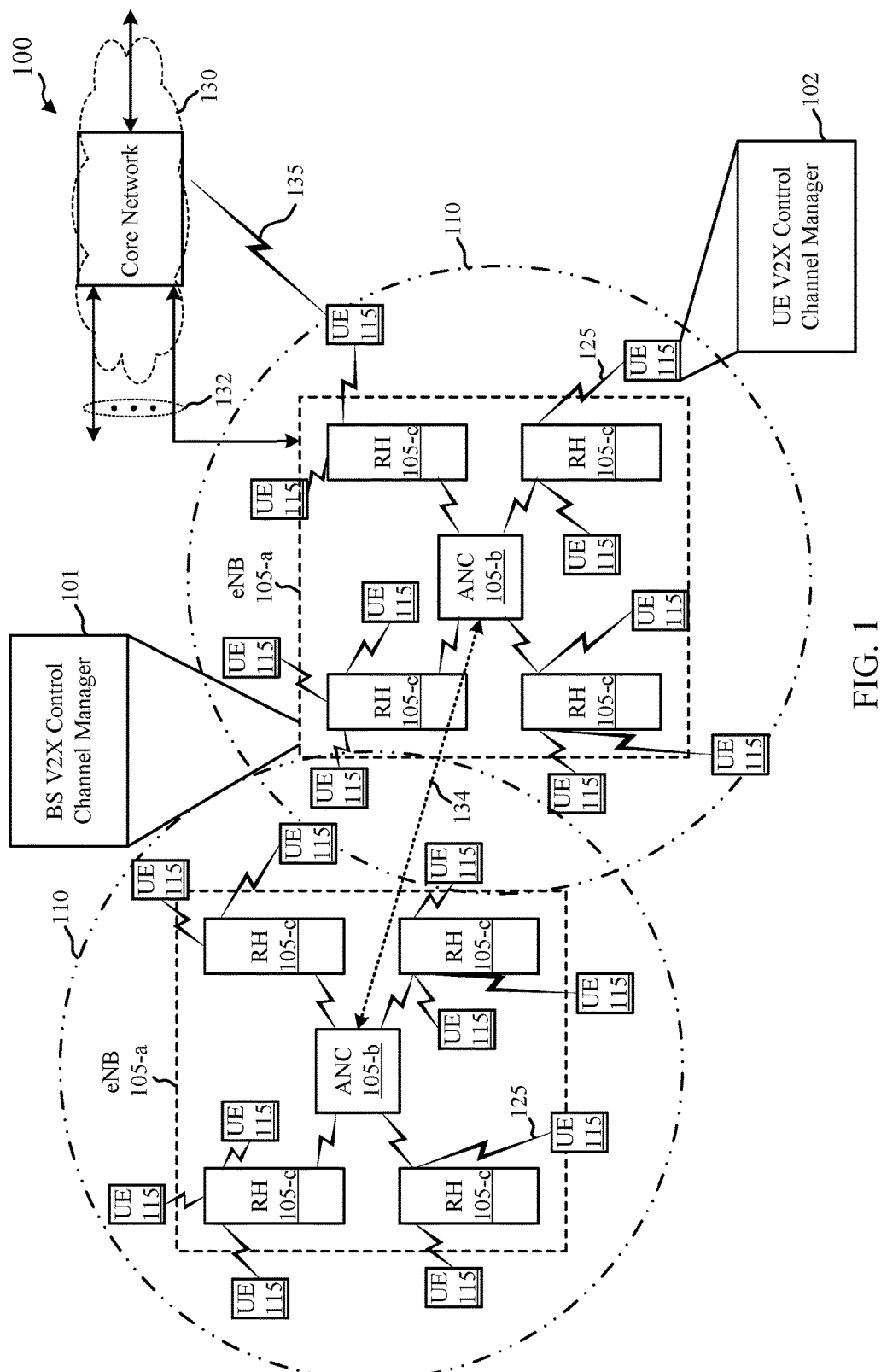
FIG. 1 illustrates an example of a system for wireless communication that supports vehicle-to-everything (V2X) control channel design in accordance with aspects of the present disclosure.

Certain wireless communication systems may be used to communicate data that is associated with high reliability and low latency. One non-limiting example of such data includes V2X and/or V2V communications. For example, self-driving cars may rely on wireless communications. Sensors used for self-driving cars may include some sensors, e.g., Light Detection and Ranging (LIDAR), radar, cameras etc., that are line of sight sensors. V2V communication, however, may include line of sight and non-line of sight wireless communications. This can be particularly helpful for the case where two vehicles are approaching intersections. V2V communication can be used to share sensor information between the vehicles. This and other communication scenarios raise certain considerations. For example, for a particular location or geographical area there may be several vehicles sensing the same information such as an obstacle or a pedestrian. This raises the question of which vehicle should broadcast such information (e.g., sensor data), how such information is shared (e.g., which channel configuration provides reduced latency and improved reliability), and the like.

Another consideration relates to the design of the control channel under existing protocols. The control channel may include a limited or fixed number of information bits and is communicated in a time-division multiplexing (TDM) manner with data. Generally, some information bits conveyed in the control channel provide an indication of the location of the data channels (or resources). Since data may span several sub-carriers (depending upon the amount of transmitted data) and the control channel is currently fixed in size, this may introduce transients or gaps in time/frequency between the control channel and the corresponding data channel. This results in unused frequency/time resources and reduces the reliability of the control channel.

Aspects of the disclosure are initially described in the context of a wireless communications system. The described techniques relate to improved methods, systems, devices, or apparatuses that support V2X control channel design. Generally, the described techniques provide for repeating the control channel in the frequency domain and/or the time domain, and making it the same size as the number of sub-channels used in a data transmission. Furthermore, the described techniques may provide for a wireless device to dynamically determine the size of the control channel based on the size of the corresponding data channel.

For example, the wireless device (e.g., a user equipment (UE) and/or a base station) may identify resource blocks (RBs) used to transmit data in a data transmission. Each resource block (RB) may include time and frequency resources, e.g., multiple symbols and sub-carriers. Thus, the RBs allocated for the data transmission may have an associated frequency width (e.g., bandwidth). The wireless device may determine a frequency width (e.g., number of sub-carriers) of a data channel in the frequency domain that is used to transmit the data based at least in part on the identified RBs. The wireless device may then dynamically determine an allocation of RBs used to transmit control information in a control channel. The allocation of RBs used to transmit the control information may be based on the frequency width of the data channel and may cause a frequency width of the control channel to match the frequency width of the data channel. The wireless device may then transmit the control information in the control channel to, for example, convey an indication of the location of the data channel. Alternatively or additionally, in some cases, the wireless device may transmit a listen before talk (LBT) communication symbol in a communication frame, the LBT communication symbol defining an amount of resources anticipated for control information and/or data. In some cases, to make medium access more efficient than random access some form of LBT communication methodology may be deployed. The term "LBT" may thus refer to a communication methodology in which a wireless device may receive a transmission that may include communication channel parameters before the wireless device transmits a communication message.

Aspects of the disclosure are further illustrated by and described with reference to apparatus diagrams, system diagrams, and flowcharts that relate to V2X control channel design.

FIG. 1 illustrates an example of a wireless communication system 100 in accordance with various aspects of the present disclosure. The wireless communication system 100 includes base stations 105, UEs 115, and a core network 130. In some examples, the wireless communications system 100 may be a Long Term Evolution (LTE) (or LTE-Advanced) network, or a New Radio (NR) network. In some cases, wireless communications system 100 may support enhanced broadband communications, ultra-reliable (i.e., mission critical) communications, low latency communications, and communications with low-cost and low-complexity devices.

Base stations 105 may wirelessly communicate with UEs 115 via one or more base station antennas. Each base station 105 may provide communication coverage for a respective geographic coverage area 110. Communication links 125 shown in wireless communications system 100 may include uplink (UL) transmissions from a UE 115 to a base station 105, or downlink (DL) transmissions, from a base station 105 to a UE 115. A UE 115 may communicate with the core network 130 through communication link 135. Control information and data may be multiplexed on an uplink channel or downlink channel according to various techniques. Control information and data may be multiplexed on a downlink channel, for example, using TDM techniques, frequency division multiplexing (FDM) techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions).

UEs 115 may be dispersed throughout the wireless communication system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, or the like.

In some cases, a UE 115 may also be able to communicate directly with other UEs (e.g., using a peer-to-peer (P2P) or device-to-device (D2D) protocol). One or more of a group of UEs 115 utilizing D2D communications may be within the coverage area 110 of a cell. Other UEs 115 in such a group may be outside the coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105.

Some UEs 115, such as MTC or Internet-of-Things (IoT) devices, may be low cost or low complexity devices, and may provide for automated communication between machines, i.e., Machine-to-Machine (M2M) communication. M2M or MTC may refer to data communication technologies that allow devices to communicate with one another or a base station 105 without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, an MTC device may operate using half-duplex (one-way) communications at a reduced peak rate. MTC devices may also be configured to enter a power saving "deep sleep" mode when not engaging in active communications. In some cases, MTC or IoT devices may be designed to support mission critical functions and wireless communications system may be configured to provide ultra-reliable communications for these functions.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

In some cases, base station 105 and UE 115 may include base station (BS) V2X control channel manager 101 and UE V2X control channel manager 102, respectively. BS V2X control channel manager 101 or UE V2X control channel manager 102 may be an example of V2X control channel manager 415 described with reference to FIG. 4. In some cases, BS V2X control channel manager 101 or UE V2X control channel manager 102 may identify resource blocks RBs used to transmit data in a data transmission. Furthermore, BS V2X control channel manager 101 or UE V2X control channel manager 102 may determine a frequency width of a data channel in a frequency domain that is used to transmit the data based on the identified RBs, dynamically determine an allocation of RBs used to transmit control information in a control channel, the allocation of RBs based on the determined frequency width of the data channel, and the allocation of RBs causing a frequency width of the control channel to match the frequency width of the data channel in the frequency domain. In some cases, BS V2X control channel manager 101 or UE V2X control channel manager 102 may further transmit the control information in the control channel to indicate a location of the data channel.

A base station 105 may be connected by an S1 interface to the core network 130. The core network may be an evolved packet core (EPC), which may include at least one mobility management entity (MME), at least one serving gateway (S-GW), and at least one packet gateway (P-GW). The MME may be the control node that processes the signaling between the UE 115 and the EPC. All user Internet Protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service (PSS).

The core network 130 may provide user authentication, access authorization, tracking, Internet Protocol (IP) connectivity, and other access, routing, or mobility functions. At least some of the network devices, such as base station 105, may include subcomponents such as an access network entity, which may be an example of an access node controller (ANC). Each access network entity may communicate with a number of UEs 115 through a number of other access network transmission entities, each of which may be an example of a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communication system 100 may operate in an ultra high frequency (UHF) frequency region using frequency bands from 700 MHz to 2600 MHz (2.6 GHz), although in some cases wireless communication system 100 may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communication system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

Thus, wireless communication system 100 may support millimeter wave (mmW) communications between UEs 115 and base stations 105. Devices operating in mmW or EHF bands may have multiple antennas to allow beamforming. That is, a base station 105 may use multiple antennas or antenna arrays to conduct beamforming operations for directional communications with a UE 115. Beamforming (which may also be referred to as spatial filtering or directional transmission) is a signal processing technique that may be used at a transmitter (e.g., a base station 105) to shape and/or steer an overall antenna beam in the direction of a target receiver (e.g., a UE 115). This may be achieved by combining elements in an antenna array in such a way that transmitted signals at particular angles experience constructive interference while others experience destructive interference.

In some cases, the antennas of a base station 105 or UE 115 may be located within one or more antenna arrays, which may support beamforming or multiple-input/multiple-output (MIMO) operations. One or more base station antennas or antenna arrays may be collocated at an antenna assembly, such as an antenna tower. In some cases, antennas or antenna arrays associated with a base station 105 may be located in diverse geographic locations. A base station 105 may multiple use antennas or antenna arrays to conduct beamforming operations for directional communications with a UE 115.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use Hybrid ARQ (HARD) to provide retransmission at the MAC layer to improve link efficiency. In the control plane, the Radio Resource Control (RRC) protocol layer may provide establishment, configuration, and maintenance of an RRC connection between a UE 115 and a network device 105-*c*, network device 105-*b*, or core network 130 supporting radio bearers for user plane data. At the Physical (PHY) layer, transport channels may be mapped to physical channels.

Time intervals in LTE or NR may be expressed in multiples of a basic time unit. Time resources may be organized according to radio frames of a given length, which may be identified by a system frame number (SFN). For example, each frame may include ten subframes numbered from 0 to 9. A subframe may be further divided into two slots, each of which contains 6 or 7 modulation symbol periods (depending on the length of the cyclic prefix prepended to each symbol). Excluding the cyclic prefix, each symbol may contain a given number of sample periods. In some cases the subframe may be the smallest scheduling unit, also known as a TTI. In other cases, a TTI may be shorter than a subframe or may be dynamically selected (e.g., in short TTI bursts or in selected component carriers using short TTIs).

A resource element may consist of one symbol period and one subcarrier (e.g., a 15 KHz frequency range). A resource block may contain 12 consecutive subcarriers in the frequency domain and, for a normal cyclic prefix in each orthogonal frequency division multiplexing (OFDM) symbol, 7 consecutive OFDM symbols in the time domain (1 slot), or 84 resource elements. The number of bits carried by each resource element may depend on the modulation scheme (the configuration of symbols that may be selected during each symbol period). Thus, the more resource blocks that a UE 115 receives and the higher the modulation scheme, the higher the data rate may be.

In some cases, wireless system 100 may utilize both licensed and unlicensed radio frequency spectrum bands. For example, wireless system 100 may employ LTE License Assisted Access (LTE-LAA) or LTE Unlicensed (LTE U) radio access technology or NR technology in an unlicensed band such as the 5 Ghz Industrial, Scientific, and Medical (ISM) band. When operating in unlicensed radio frequency spectrum bands, wireless devices such as base stations 105 and UEs 115 may employ listen-before-talk (LBT) procedures to ensure the channel is clear before transmitting data. In some cases, operations in unlicensed bands may be based on a carrier aggregation (CA) configuration in conjunction with component carriers (CCs) operating in a licensed band. Operations in unlicensed spectrum may include downlink transmissions, uplink transmissions, or both. Duplexing in unlicensed spectrum may be based on frequency division duplexing (FDD), time division duplexing (TDD) or a combination of both.

Wireless communication systems may include or support networks used for vehicle based communications, also referred to as V2X, V2V networks, and/or C-V2X networks. Vehicle based communication networks may provide always on telematics where UEs 115, e.g., v-UEs, communicate directly to V2N, to pedestrian UEs (V2P), to infrastructure devices (V21), and to other v-UEs (e.g., via the network). The vehicle based communication networks may support a safe, always-connected driving experience by providing intelligent connectivity where traffic signal/timing, real-time traffic and routing, safety alerts to pedestrians/bicyclist, collision avoidance information, etc., are exchanged.

In some aspects, the described techniques may refer to a wireless device. The wireless device referenced may include a UE 115 and/or a base station 105. For example, one or both of a UE 115 and/or a base station 105 may be configured to identify RBs used to transmit data in a data transmission. The UE 115 and/or base station 105 may determine a frequency width of the data channel in the frequency domain that is used to transmit the data based on the identified RBs. The UE 115 and/or base station 105 may dynamically determine an allocation of RBs used to transmit control information in a control channel. The allocation of RBs may be based on the frequency width of the data channel and may cause a frequency width of the control channel to match (or be within a predefined range of) the data channel in the frequency domain. The UE 115 and/or base station 105 may transmit the control information in the control channel to indicate a location of the data channel.

Figure 2:
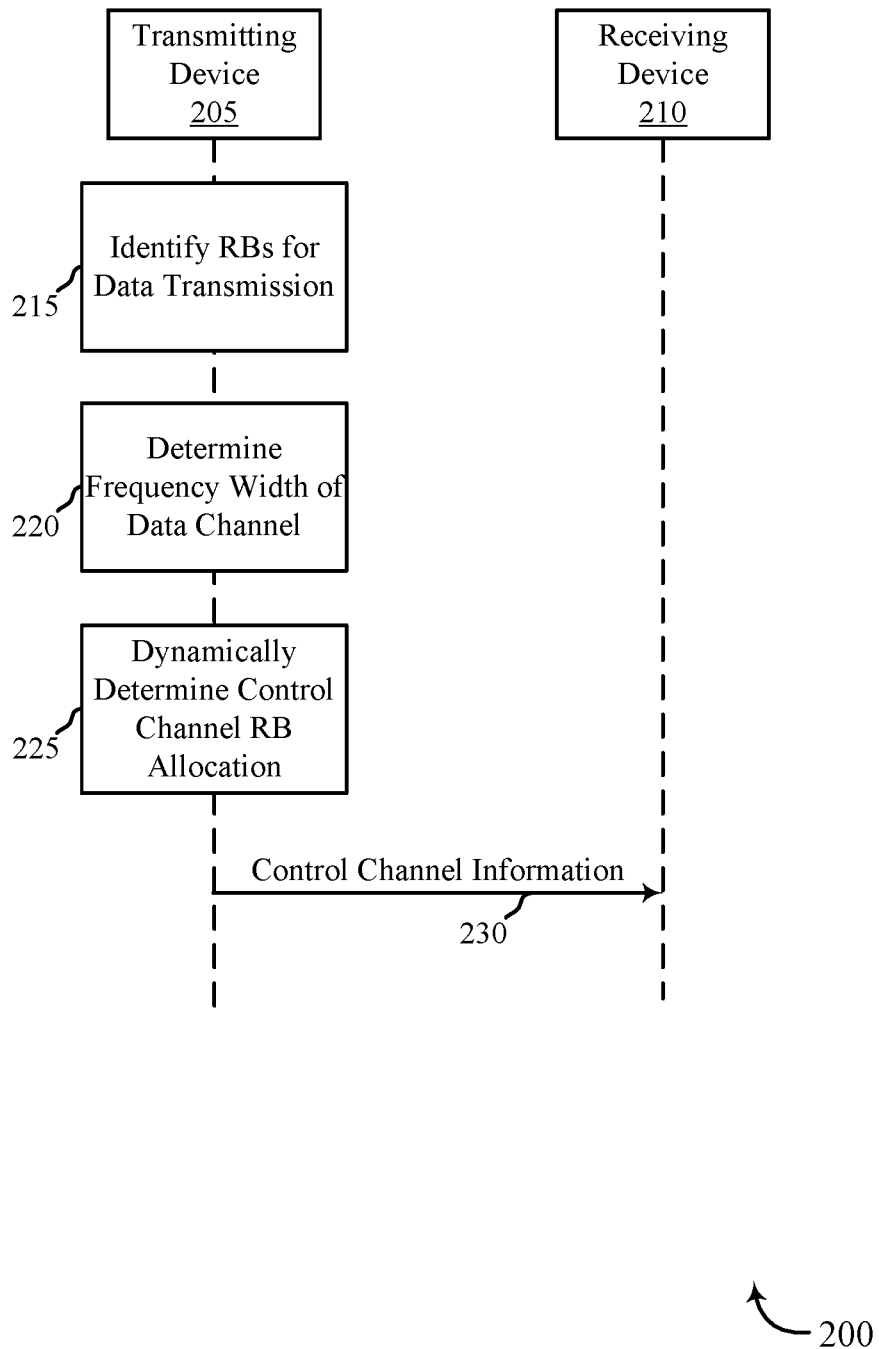
FIG. 2 illustrates an example of a process that supports V2X control channel design in accordance with aspects of the present disclosure.

FIG. 2 illustrates an example of a process 200 for V2X control channel design. Process 200 may implement aspect(s) of wireless communication system 100 of FIG. 1. Process 200 may include a transmitting device 205 and a receiving device 210. Transmitting device 205 and/or receiving device 210 can be either a UE 115 or a base station 105, as described herein.

Generally, process 200 illustrates an example of dynamic sizing of control channel to match the data channels. For example, process 200 repeats the control channel in the frequency domain, time domain, or both, and allocates RBs to cause the control channel to be the same size as the number of sub-carriers occupied by the data channel. This may improve reliability of the control channel and may avoid transients, e.g., avoids wasted time/frequency resources.

At 215, transmitting device 205 may identify RBs for a data transmission. For example, transmitting device 205 may identify which RBs are allocated or otherwise being used to transmit data in a data transmission. This may include determining the number of RBs identified for the data transmission. Each resource block may include a plurality of symbol periods and sub-carriers. Moreover, transmitting device 205 may determine for one or each identified RB, where the starting point is and what the length is for the data transmitted in the data transmission. In some aspects, transmitting device may identify the sub-channels that are used to transmit the data in the data transmission. The data transmission may be a vehicle-based transmission, e.g., a V2X transmission, a V2V transmission, and the like.

At 220, transmitting device 205 may determine the frequency width of the data channel. For example, transmitting device 205 may determine a frequency width of a data channel in a frequency domain that is used to transmit the data based at least in part on the identified RBs. The determined frequency width may be based, at least in some aspects, on the identified sub-channels that are used to transmit the data in the data transmission. The determined frequency width may be based, at least in some aspects, on the number of RBs used to transit the data in the data transmission.

At 225, transmitting device 205 may dynamically determine the control channel RB allocation. For example, the transmitting device 205 may dynamically determine an allocation of RBs used to transmit control information in the control channel. The allocation of RBs may be based on, for example, the determined frequency width of the data channel and may cause a frequency width of the control channel to match (or be within a predefined range of) the frequency width of the data channel in the frequency domain. Dynamically determining the allocation of RBs may include matching the frequency width of the control channel with the data channel on a per-data transmission basis, on a per-subframe basis, or on some other basis. Accordingly, the frequency width of the control channel may be different for different data transmissions, for different subframes, and the like.

In some aspects, the control channel may be repeated in the frequency domain. For example, each subcarrier, group of sub-carriers, RB, group of RBs, etc., may carry the same control information on the control channel. In some aspects, the control information may be configured according to the starting point and length of the data being transmitted in the data transmission.

In some aspects, the number of RBs used to transmit the data and/or the number of sub-channels used to transmit the data may be used to dynamically allocate the RBs used to transmit the control information in the control channel. For example, the allocated RBs used to transmit the control information may include the same number of RBs used to transmit the data, the same number of sub-carriers used to transmit the data, etc.

At 230, transmitting device 205 may transmit the control channel information to receiving device 210. For example, transmitting device 205 may transmit the control information in the control channel to indicate a location of the data channel. As discussed, the control channel may be repeated in the frequency domain, time domain, or both. The control information may include bit(s), field(s), parameter(s), and the like that are configured based on the data transmission.

For example, the control information may convey an indication of the starting point of the data in the data transmission, a length of the data being transmitted in the data transmission, and the like. In some aspects, transmitting device 205 may transmit the data in the data channel in conjunction with transmitting the control information in the control channel.

In some cases, transmitting device 205 may perform an LBT procedure prior to transmissions. In some cases, the LBT procedure may involve transmitting an LBT channel occupying one or more LBT symbols. Furthermore, in some cases, the amount of resources occupied by the one or more LBT symbols may be directly proportional to, and define, the amount of resources that the UE is utilizing for V2X communications. For example, the amount of frequency resources occupied by the one or more LBT symbols may be the same as the amount of frequency resource occupied by the control and data channels. Accordingly, the signal transmitted in the one or more LBT symbols may be proportional to, and may be different in the frequency domain for different lengths of the LBT transmission. In other words, the length of preamble (sequence) transmitted by the one or more LBT symbols may directly correspond to the amount of desired bandwidth resources used for data transmission. Furthermore, in some cases, the receiving device 210 may perform a channel estimation of the control channel based in part on the LBT sequence utilized by the transmitting device 205.

Figure 3:
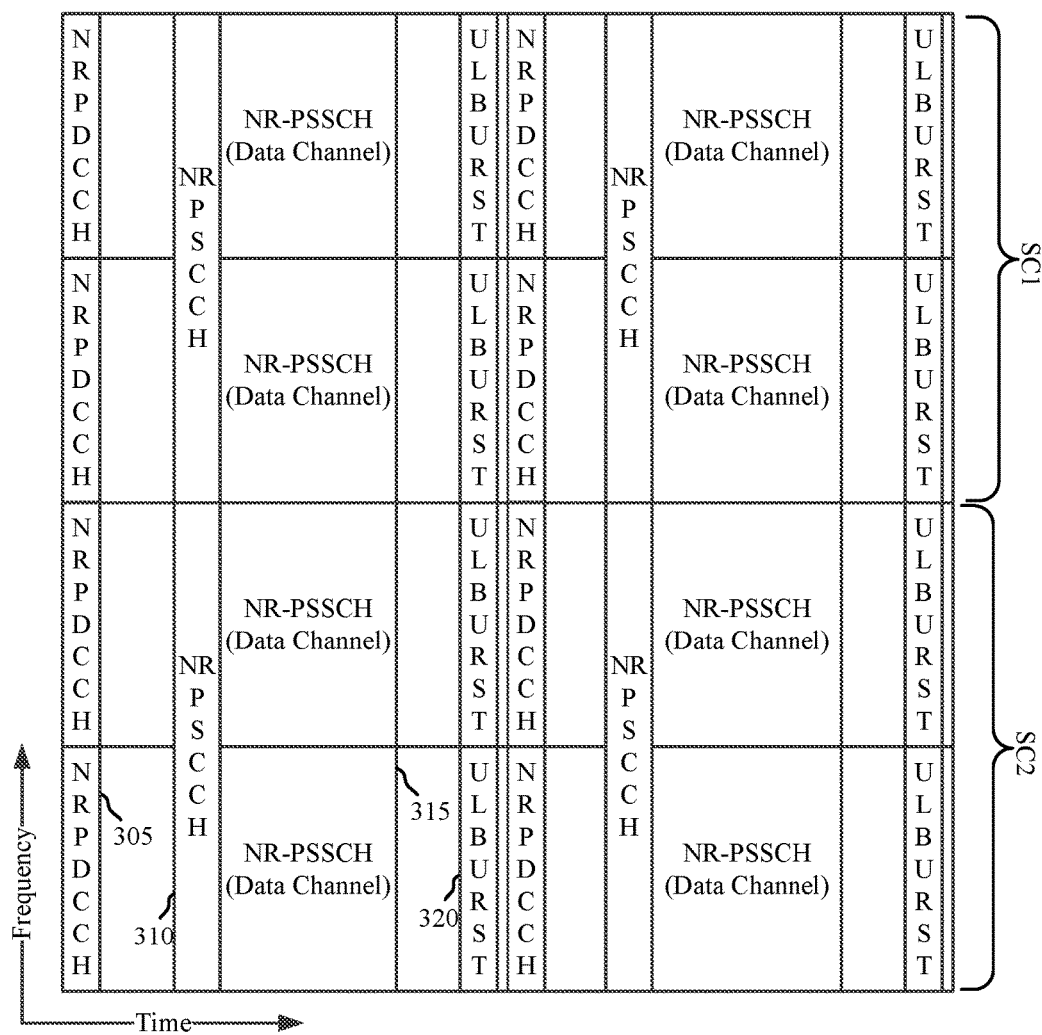
FIG. 3 illustrates an example of a channel configuration that supports V2X control channel design in accordance with aspects of the present disclosure.

FIG. 3 illustrates an example of a channel configuration 300 for V2X control channel design. Channel configuration 300 may implement (or be implemented by) wireless communication system 100 and/or process 200 of FIGS. 1 and 2. For example, a transmitting device and/or a receiving device may implement aspect(s) of channel configuration 300 for use in communicating sensor data between the devices.

Channel configuration 300 illustrates one example of a channel configuration that supports aspects of the present disclosure. For example, channel configuration 300 illustrates a channel configuration including two sub-channels (SC1 and SC2) that span two subframes. Channel configuration 300 is not limited to two sub-channels and/or two subframes but may instead have more or less than two sub-channels and more or less than two subframes. Each subframe of a sub-channel may include a first control channel 305 (e.g., NR physical downlink control channel (NR-PDCCH), a second control channel 310 (e.g., a NR physical sidelink control channel (NR-PSCCH)), a data channel 315 (e.g., NR physical sidelink shared channel (PSSCH)), and an uplink burst channel 320 (e.g., UL-BURST channel). The NR-PSCCH is a control channel over which control information is communicated and the NR-PSSCH is a data channel over which data is communicated. Within each subframe of a sub-channel, the first control channel 305 may be repeated twice within a sub-channel.

As used herein, references to dynamically allocated RBs used to transmit control information in a control channel refers to the second control channel 310. For example, the transmitting device may allocate the RBs for the second control channel 310 to cause the frequency width of the control channel to match the frequency width of the data channel 315. As the data being transmitted in the data channel 315 may have a longer length, the data channel 315 may extend across each sub-channel. Moreover, dynamically allocating the RBs used to transmit the control information may prevent any gaps or transient periods between the second control channel 310 and the corresponding data channel 315.

The data channel 315 generally includes RB(s) used to convey the data being transmitted in the data transmission. The uplink burst channel 320 may generally provide a channel for the transmitting device and/or other UEs to transmit uplink information to a base station.

Figure 4:
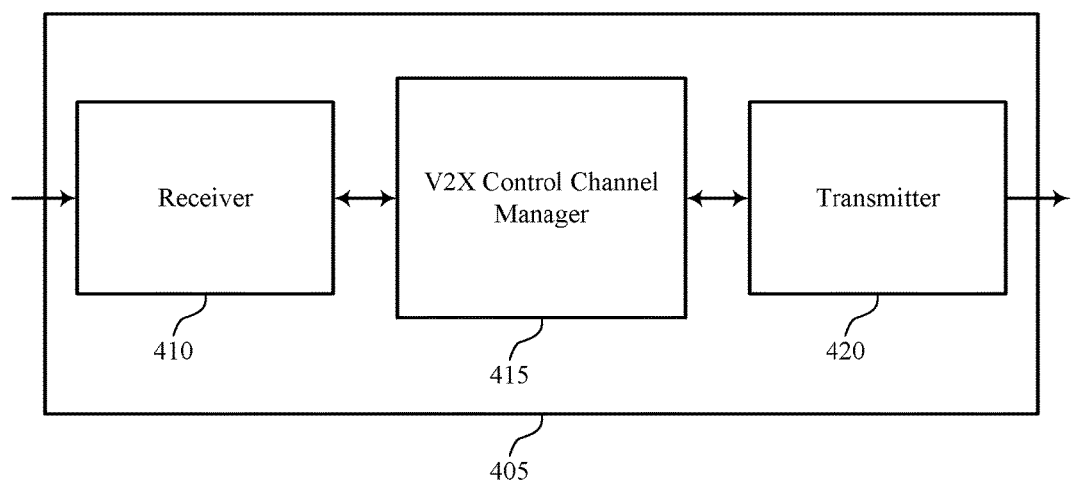
FIGS. 4 through 6 show block diagrams of a device that supports V2X control channel design in accordance with aspects of the present disclosure.

FIG. 4 shows a block diagram 400 of a wireless device 405 that supports V2X control channel design in accordance with various aspects of the present disclosure. Wireless device 405 may be an example of aspects of a user equipment (UE) 115 or base station 105 as described with reference to FIG. 1. Wireless device 405 may include a receiver 410, a V2X control channel manager 415, and a transmitter 420. Wireless device 405 may also include a processor. Each of these components may be in communication with one another (e.g., via one or more buses).

Receiver 410 may receive information such as packets, user data, or control information associated with various information channels (e.g., control channels, data channels, and information related to V2X control channel design, etc.). Information may be passed on to other components of the device. The receiver 410 may be an example of aspects of the transceiver 735 described with reference to FIG. 7.

V2X control channel manager 415 may be an example of aspects of the V2X control channel manager 715 described with reference to FIG. 7.

V2X control channel manager 415 and/or at least some of its various sub-components may be implemented in hardware, software executed by a processor, firmware, or any combination thereof. If implemented in software executed by a processor, the functions of the V2X control channel manager 415 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

V2X control channel manager 415 may identify resource blocks RBs used to transmit data in a data transmission. V2X control channel manager 415 may determine a frequency width of a data channel in a frequency domain that is used to transmit the data based on the identified RBs. V2X control channel manager 415 may dynamically determine an allocation of RBs used to transmit control information in a control channel, the allocation of RBs based on the determined frequency width of the data channel, and the allocation of RBs causing a frequency width of the control channel to match the frequency width of the data channel in the frequency domain. V2X control channel manager 415 may transmit the control information in the control channel to indicate a location of the data channel.

Transmitter 420 may transmit signals generated by other components of the device. In some examples, the transmitter 420 may be collocated with a receiver 410 in a transceiver module. For example, the transmitter 420 may be an example of aspects of the transceiver 735 described with reference to FIG. 7. The transmitter 420 may include a single antenna, or it may include a set of antennas.

Figure 5:
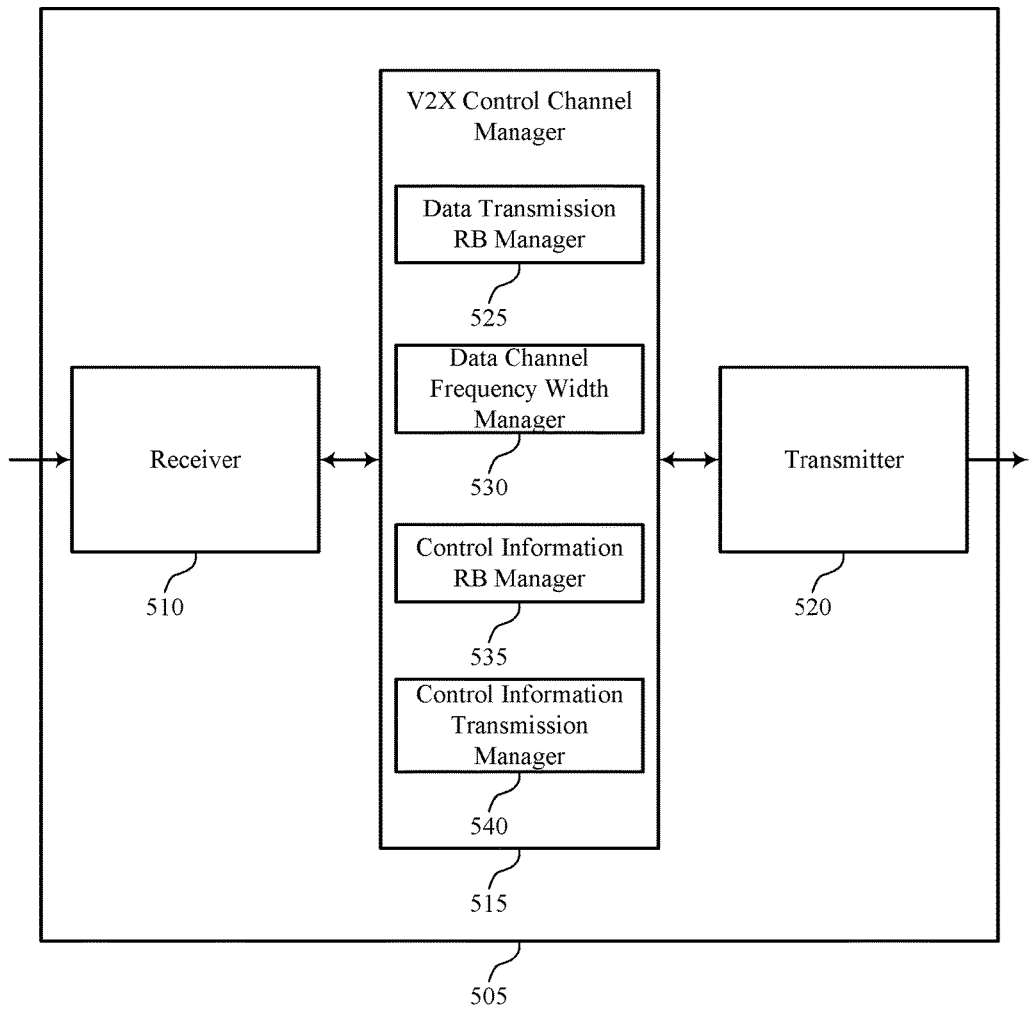

FIG. 5 shows a block diagram 500 of a wireless device 505 that supports V2X control channel design in accordance with various aspects of the present disclosure. Wireless device 505 may be an example of aspects of a wireless device 405, or a UE 115, or base station 105 as described with reference to FIGS. 1 and 4. Wireless device 505 may include a receiver 510, a V2X control channel manager 515, and a transmitter 520. Wireless device 505 may also include a processor. Each of these components may be in communication with one another (e.g., via one or more buses).

Receiver 510 may receive information such as packets, user data, or control information associated with various information channels (e.g., control channels, data channels, and information related to V2X control channel design, etc.). Information may be passed on to other components of the device. The receiver 510 may be an example of aspects of the transceiver 735 described with reference to FIG. 7.

V2X control channel manager 515 may be an example of aspects of the V2X control channel manager 715 described with reference to FIG. 7.

V2X control channel manager 515 may also include a data transmission RB manager 525, a data channel frequency width manager 530, a control information RB manager 535, and a control information transmission manager 540.

Data transmission RB manager 525 may identify RBs used to transmit data in a data transmission. Data transmission RB manager 525 may determine a number of RBs used to transmit the data transmission. Dynamically determining the allocation of RBs used to transmit control information is based on the number of RBs used to transmit the data transmission.

Data channel frequency width manager 530 may determine a frequency width of a data channel in a frequency domain that is used to transmit the data based on the identified RBs.

Control information RB manager 535 may dynamically determine an allocation of RBs used to transmit control information in a control channel, the allocation of RBs based on the determined frequency width of the data channel, and the allocation of RBs causing a frequency width of the control channel to match the frequency width of the data channel in the frequency domain. In some cases, dynamically determining the allocation of RBs further includes repeating the control channel in the frequency domain, time domain, or both.

Control information transmission manager 540 may transmit the control information in the control channel to indicate a location of the data channel.

Transmitter 520 may transmit signals generated by other components of the device. In some examples, the transmitter 520 may be collocated with a receiver 510 in a transceiver module. For example, the transmitter 520 may be an example of aspects of the transceiver 735 described with reference to FIG. 7. The transmitter 520 may include a single antenna, or it may include a set of antennas.

Figure 6:
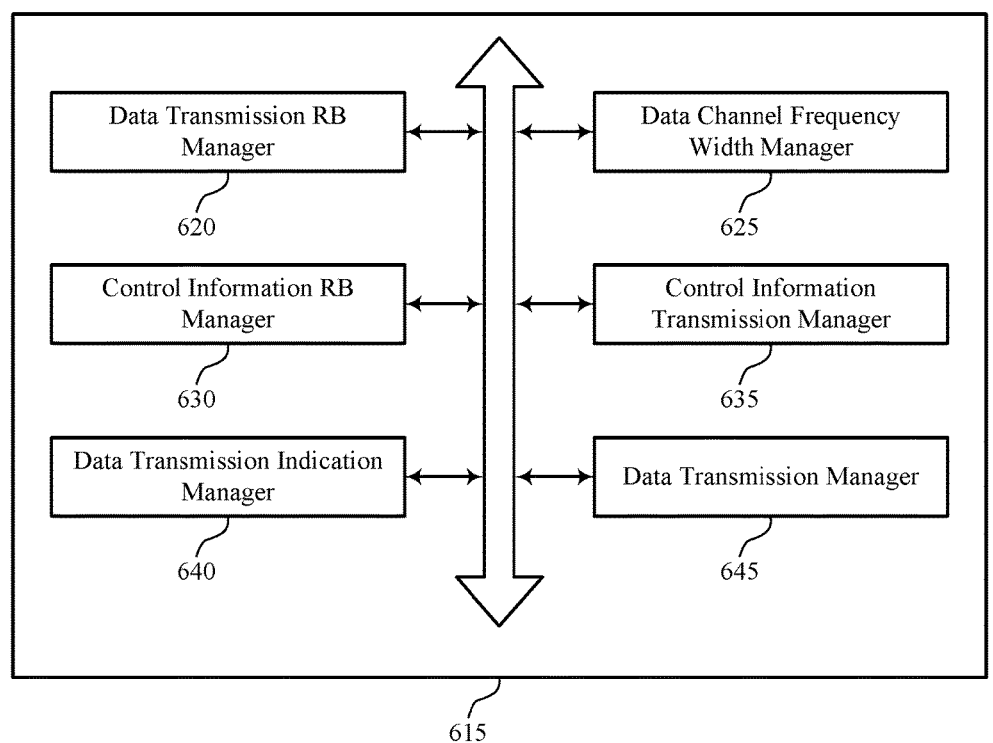

FIG. 6 shows a block diagram 600 of a V2X control channel manager 615 that supports V2X control channel design in accordance with various aspects of the present disclosure. The V2X control channel manager 615 may be an example of aspects of a V2X control channel manager 415, a V2X control channel manager 515, or a V2X control channel manager 715 described with reference to FIGS. 4, 5, and 7. The V2X control channel manager 615 may include a data transmission RB manager 620, a data channel frequency width manager 625, a control information RB manager 630, a control information transmission manager 635, a data transmission indication manager 640, and a data transmission manager 645. Each of these modules may communicate, directly or indirectly, with one another (e.g., via one or more buses).

Data transmission RB manager 620 may identify RBs used to transmit data in a data transmission. Data transmission RB manager 620 may determine a number of RBs used to transmit the data transmission. Dynamically determining the allocation of RBs used to transmit control information is based on the number of RBs used to transmit the data transmission.

Data channel frequency width manager 625 may determine a frequency width of a data channel in a frequency domain that is used to transmit the data based on the identified RBs.

Control information RB manager 630 may dynamically determine an allocation of RBs used to transmit control information in a control channel, the allocation of RBs based on the determined frequency width of the data channel, and the allocation of RBs causing a frequency width of the control channel to match the frequency width of the data channel in the frequency domain. In some cases, dynamically determining the allocation of RBs further includes repeating the control channel in the frequency domain and/or the time domain.

Control information transmission manager 635 may transmit the control information in the control channel to indicate a location of the data channel.

Data transmission indication manager 640 may identify a starting point and a length of the data transmitted in the data transmission. Data transmission indication manager 640 may configure the control information based on the starting point and the length of the data. Data transmission indication manager 640 may identify a set of sub-channels used to transmit the data in the data transmission. Data transmission indication manager 640 may dynamically determine the allocation of RBs used to transmit the control information based on the set of sub-channels. In some cases, the allocation of RBs of the control channel includes allocating a same number of allocated RBs used to transmit control information as a number of identified RBs used to transmit the data.

Data transmission manager 645 may transmit the data in the data channel in conjunction with transmitting the control information in the control channel. In some cases, the control information includes information bits configured according to the data transmission. In some cases, the data transmission includes a V2X transmission or a V2V transmission.

Figure 7:
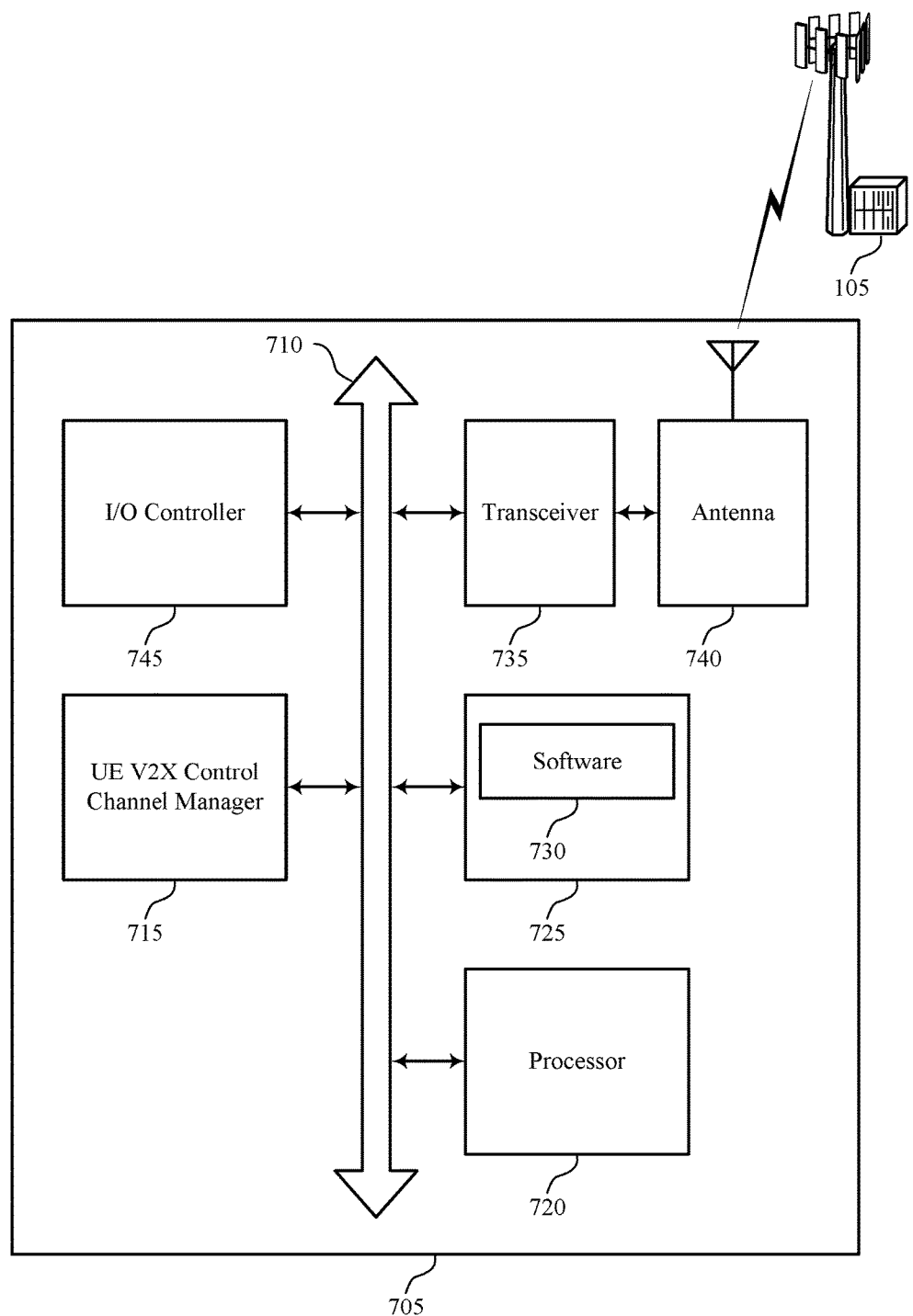
FIG. 7 illustrates a block diagram of a system including a UE that supports V2X control channel design in accordance with aspects of the present disclosure.

FIG. 7 shows a diagram of a system 700 including a device 705 that supports V2X control channel design in accordance with various aspects of the present disclosure. Device 705 may be an example of or include the components of wireless device 405, wireless device 505, or a UE 115 as described above, e.g., with reference to FIGS. 1 through 5. Device 705 may include components for bi-directional voice and data communications including components for transmitting and receiving communications, including a UE V2X control channel manager 715, a processor 720, a memory 725, a software 730, a transceiver 735, an antenna 740, and an I/O controller 745. These components may be in electronic communication via one or more busses (e.g., bus 710). Device 705 may communicate wirelessly with one or more base stations 105.

Processor 720 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 720 may be configured to operate a memory array using a memory controller. In other cases, a memory controller may be integrated into processor 720. Processor 720 may be configured to execute computer-readable instructions stored in a memory to perform various functions (e.g., functions or tasks supporting V2X control channel design).

Memory 725 may include random access memory (RAM) and read only memory (ROM). The memory 725 may store computer-readable, computer-executable software 730 including instructions that, when executed, cause the processor to perform various functions described herein. In some cases, the memory 725 may contain, among other things, a basic input/output system (BIOS) which may control basic hardware and/or software operation such as the interaction with peripheral components or devices.

Software 730 may include code to implement aspects of the present disclosure, including code to support V2X control channel design. Software 730 may be stored in a non-transitory computer-readable medium such as system memory or other memory. In some cases, the software 730 may not be directly executable by the processor but may cause a computer (e.g., when compiled and executed) to perform functions described herein.

Transceiver 735 may communicate bi-directionally, via one or more antennas, wired, or wireless links as described above. For example, the transceiver 735 may represent a wireless transceiver and may communicate bi-directionally with another wireless transceiver. The transceiver 735 may also include a modem to modulate the packets and provide the modulated packets to the antennas for transmission, and to demodulate packets received from the antennas.

In some cases, the wireless device may include a single antenna 740. However, in some cases the device may have more than one antenna 740, which may be capable of concurrently transmitting or receiving multiple wireless transmissions.

I/O controller 745 may manage input and output signals for device 705. I/O controller 745 may also manage peripherals not integrated into device 705. In some cases, I/O controller 745 may represent a physical connection or port to an external peripheral. In some cases, I/O controller 745 may utilize an operating system such as iOS®, ANDROID®, MS-DOS®, MS-WINDOWS®, OS/2®, UNIX®, LINUX®, or another known operating system. In other cases, I/O controller 745 may represent or interact with a modem, a keyboard, a mouse, a touchscreen, or a similar device. In some cases, I/O controller 745 may be implemented as part of a processor. In some cases, a user may interact with device 705 via I/O controller 745 or via hardware components controlled by I/O controller 745.

Figure 8:
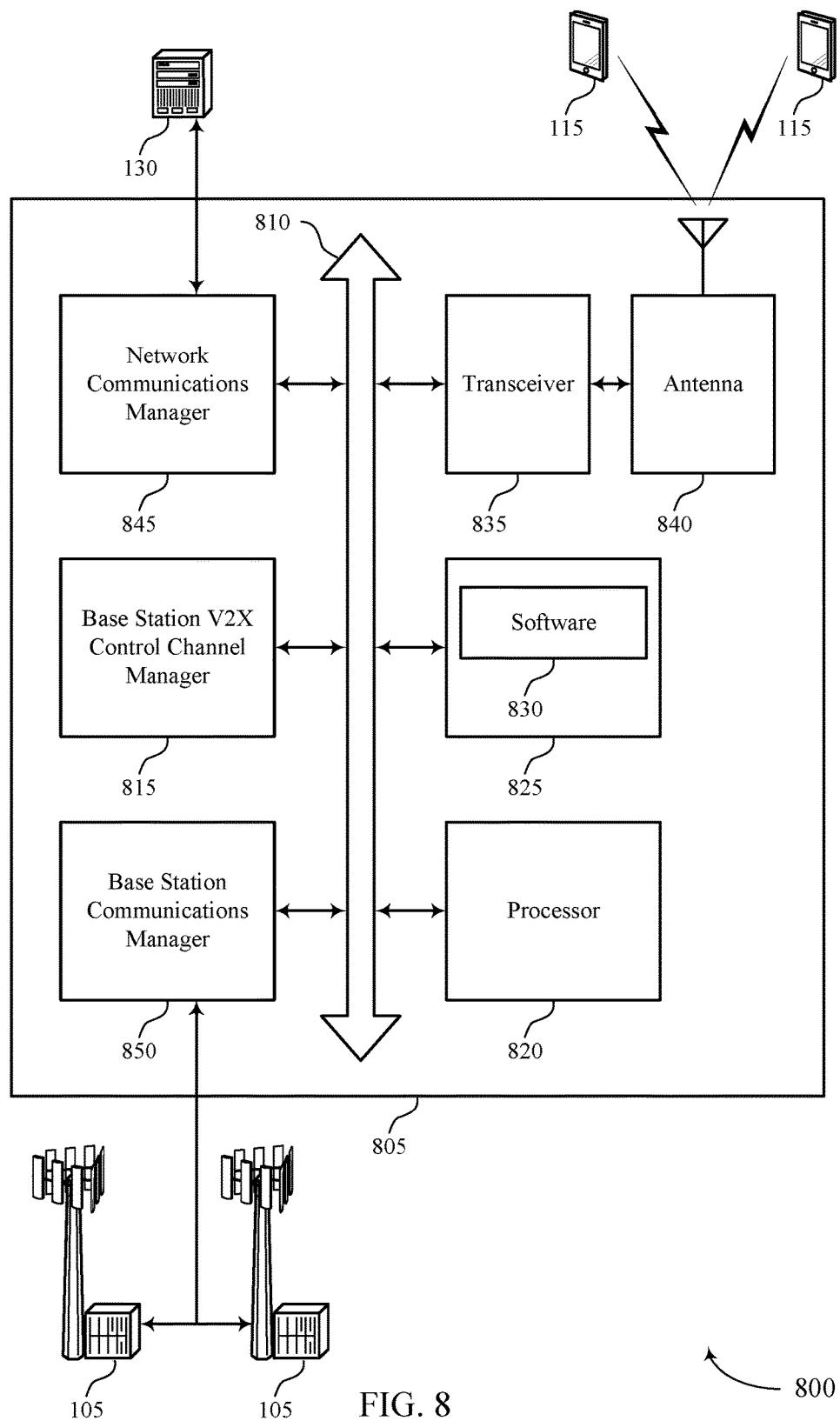
FIG. 8 illustrates a block diagram of a system including a base station that supports V2X control channel design in accordance with aspects of the present disclosure.

FIG. 8 shows a diagram of a system 800 including a device 805 that supports V2X control channel design in accordance with various aspects of the present disclosure. Device 805 may be an example of or include the components of wireless device 505, wireless device 605, or a base station 105 as described above, e.g., with reference to FIGS. 1 through 6. Device 805 may include components for bi-directional voice and data communications including components for transmitting and receiving communications, including a base station V2X control channel manager 815, a processor 820, a memory 825, a software 830, a transceiver 835, an antenna 840, a network communications manager 845, and a base station communications manager 850. These components may be in electronic communication via one or more busses (e.g., bus 810). Device 805 may communicate wirelessly with one or more UEs 115.

Processor 820 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 820 may be configured to operate a memory array using a memory controller. In other cases, a memory controller may be integrated into processor 820. Processor 820 may be configured to execute computer-readable instructions stored in a memory to perform various functions (e.g., functions or tasks supporting V2X control channel design).

Memory 825 may include RAM and ROM. The memory 825 may store computer-readable, computer-executable software 830 including instructions that, when executed, cause the processor to perform various functions described herein. In some cases, the memory 825 may contain, among other things, a BIOS which may control basic hardware and/or software operation such as the interaction with peripheral components or devices.

Software 830 may include code to implement aspects of the present disclosure, including code to support V2X control channel design. Software 830 may be stored in a non-transitory computer-readable medium such as system memory or other memory. In some cases, the software 830 may not be directly executable by the processor but may cause a computer (e.g., when compiled and executed) to perform functions described herein.

Transceiver 835 may communicate bi-directionally, via one or more antennas, wired, or wireless links as described above. For example, the transceiver 835 may represent a wireless transceiver and may communicate bi-directionally with another wireless transceiver. The transceiver 835 may also include a modem to modulate the packets and provide the modulated packets to the antennas for transmission, and to demodulate packets received from the antennas.

In some cases, the wireless device may include a single antenna 840. However, in some cases the device may have more than one antenna 840, which may be capable of concurrently transmitting or receiving multiple wireless transmissions.

Network communications manager 845 may manage communications with the core network (e.g., via one or more wired backhaul links). For example, the network communications manager 845 may manage the transfer of data communications for client devices, such as one or more UEs 115.

Base station communications manager 850 may manage communications with other base station 105, and may include a controller or scheduler for controlling communications with UEs 115 in cooperation with other base stations 105. For example, the base station communications manager 850 may coordinate scheduling for transmissions to UEs 115 for various interference mitigation techniques such as beamforming or joint transmission. In some examples, base station communications manager 850 may provide an X2 interface within an LTE/LTE-A wireless communication network technology to provide communication between base stations 105.

Figure 9:
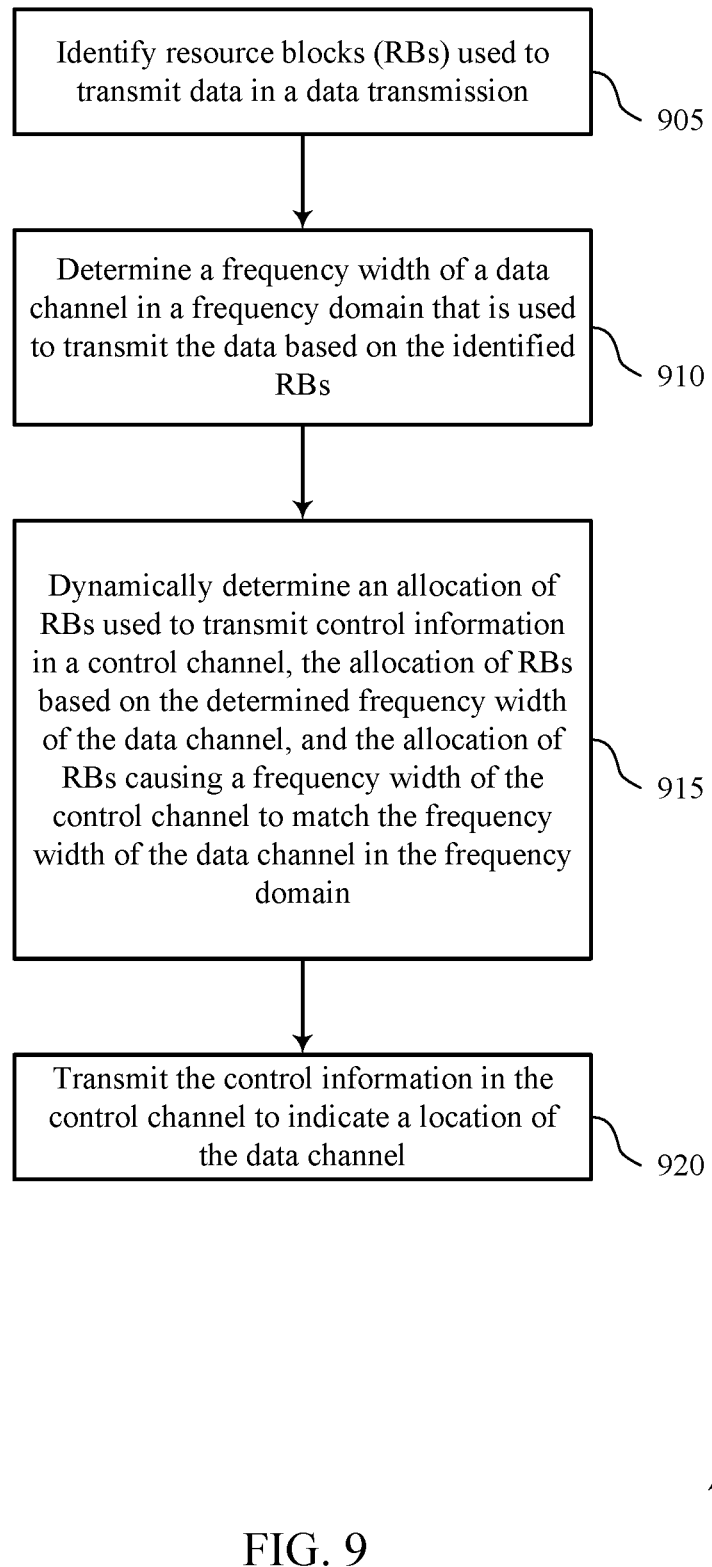
FIGS. 9 through 11 illustrate methods for V2X control channel design in accordance with aspects of the present disclosure.

FIG. 9 shows a flowchart illustrating a method 900 for V2X control channel design in accordance with various aspects of the present disclosure. The operations of method 900 may be implemented by a UE 115 or base station 105 or its components as described herein. For example, the operations of method 900 may be performed by a V2X control channel manager as described with reference to FIGS. 4 through 6. In some examples, a UE 115 or base station 105 may execute a set of codes to control the functional elements of the device to perform the functions described below. Additionally or alternatively, the UE 115 or base station 105 may perform aspects of the functions described below using special-purpose hardware.

At 905, the UE 115 or base station 105 may identify RBs used to transmit data in a data transmission. The operations of 905 may be performed according to the methods described with reference to FIGS. 1 through 3. In certain examples, aspects of the operations of 905 may be performed by a data transmission RB manager as described with reference to FIGS. 4 through 6.

At 910, the UE 115 or base station 105 may determine a frequency width of a data channel in a frequency domain that is used to transmit the data based at least in part on the identified RBs. The operations of 910 may be performed according to the methods described with reference to FIGS. 1 through 3. In certain examples, aspects of the operations of 910 may be performed by a data channel frequency width manager as described with reference to FIGS. 4 through 6.

At 915, the UE 115 or base station 105 may dynamically determine an allocation of RBs used to transmit control information in a control channel, the allocation of RBs based at least in part on the determined frequency width of the data channel, and the allocation of RBs causing a frequency width of the control channel to match the frequency width of the data channel in the frequency domain. The operations of 915 may be performed according to the methods described with reference to FIGS. 1 through 3. In certain examples, aspects of the operations of 915 may be performed by a control information RB manager as described with reference to FIGS. 4 through 6.

At 920, the UE 115 or base station 105 may transmit the control information in the control channel to indicate a location of the data channel. The operations of 920 may be performed according to the methods described with reference to FIGS. 1 through 3. In certain examples, aspects of the operations of 920 may be performed by a control information transmission manager as described with reference to FIGS. 4 through 6.

Figure 10:
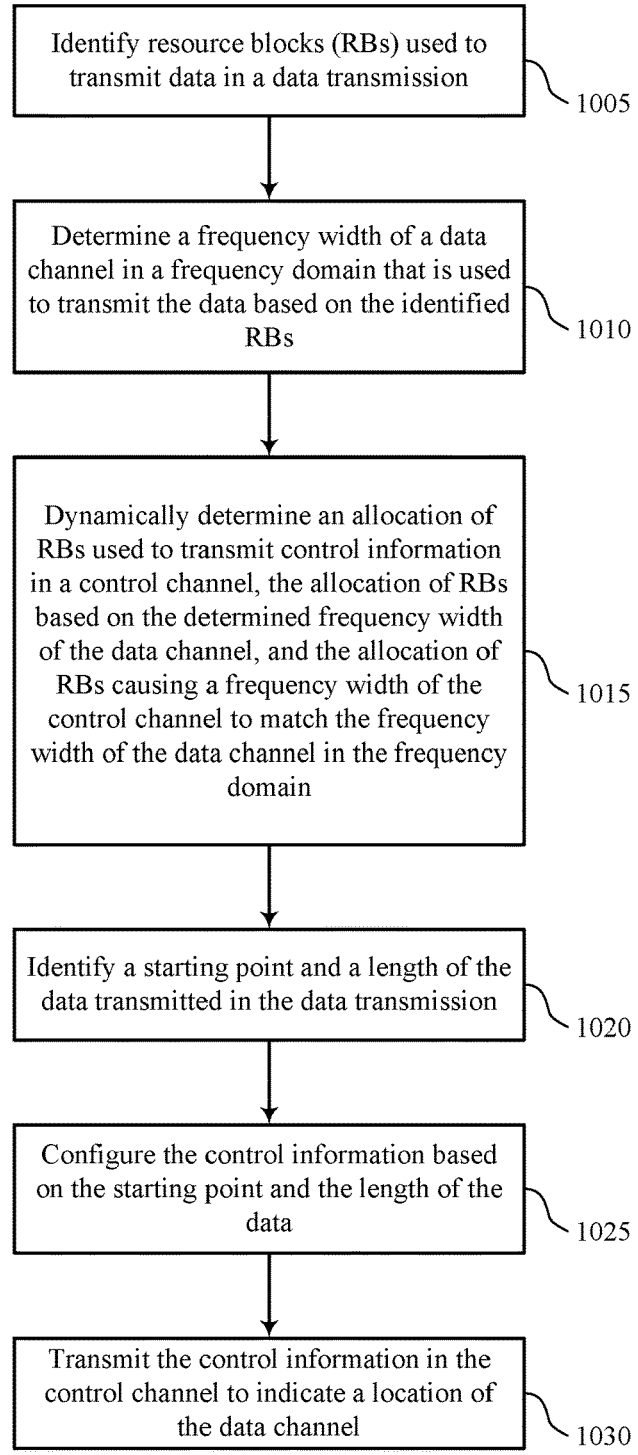

FIG. 10 shows a flowchart illustrating a method 1000 for V2X control channel design in accordance with various aspects of the present disclosure. The operations of method 1000 may be implemented by a UE 115 or base station 105 or its components as described herein. For example, the operations of method 1000 may be performed by a V2X control channel manager as described with reference to FIGS. 4 through 6. In some examples, a UE 115 or base station 105 may execute a set of codes to control the functional elements of the device to perform the functions described below. Additionally or alternatively, the UE 115 or base station 105 may perform aspects of the functions described below using special-purpose hardware.

At 1005, the UE 115 or base station 105 may identify RBs used to transmit data in a data transmission. The operations of 1005 may be performed according to the methods described with reference to FIGS. 1 through 3. In certain examples, aspects of the operations of 1005 may be performed by a data transmission RB manager as described with reference to FIGS. 4 through 6.

At 1010, the UE 115 or base station 105 may determine a frequency width of a data channel in a frequency domain that is used to transmit the data based at least in part on the identified RBs. The operations of 1010 may be performed according to the methods described with reference to FIGS. 1 through 3. In certain examples, aspects of the operations of 1010 may be performed by a data channel frequency width manager as described with reference to FIGS. 4 through 6.

At 1015, the UE 115 or base station 105 may dynamically determine an allocation of RBs used to transmit control information in a control channel, the allocation of RBs based at least in part on the determined frequency width of the data channel, and the allocation of RBs causing a frequency width of the control channel to match the frequency width of the data channel in the frequency domain. The operations of 1015 may be performed according to the methods described with reference to FIGS. 1 through 3. In certain examples, aspects of the operations of 1015 may be performed by a control information RB manager as described with reference to FIGS. 4 through 6.

At 1020, the UE 115 or base station 105 may identify a starting point and a length of the data transmitted in the data transmission. The operations of 1020 may be performed according to the methods described with reference to FIGS. 1 through 3. In certain examples, aspects of the operations of 1020 may be performed by a data transmission indication manager as described with reference to FIGS. 4 through 6.

At 1025, the UE 115 or base station 105 may configure the control information based at least in part on the starting point and the length of the data. The operations of 1025 may be performed according to the methods described with reference to FIGS. 1 through 3. In certain examples, aspects of the operations of 1025 may be performed by a data transmission indication manager as described with reference to FIGS. 4 through 6.

At 1030, the UE 115 or base station 105 may transmit the control information in the control channel to indicate a location of the data channel. The operations of 1030 may be performed according to the methods described with reference to FIGS. 1 through 3. In certain examples, aspects of the operations of 1030 may be performed by a control information transmission manager as described with reference to FIGS. 4 through 6.

Figure 11:
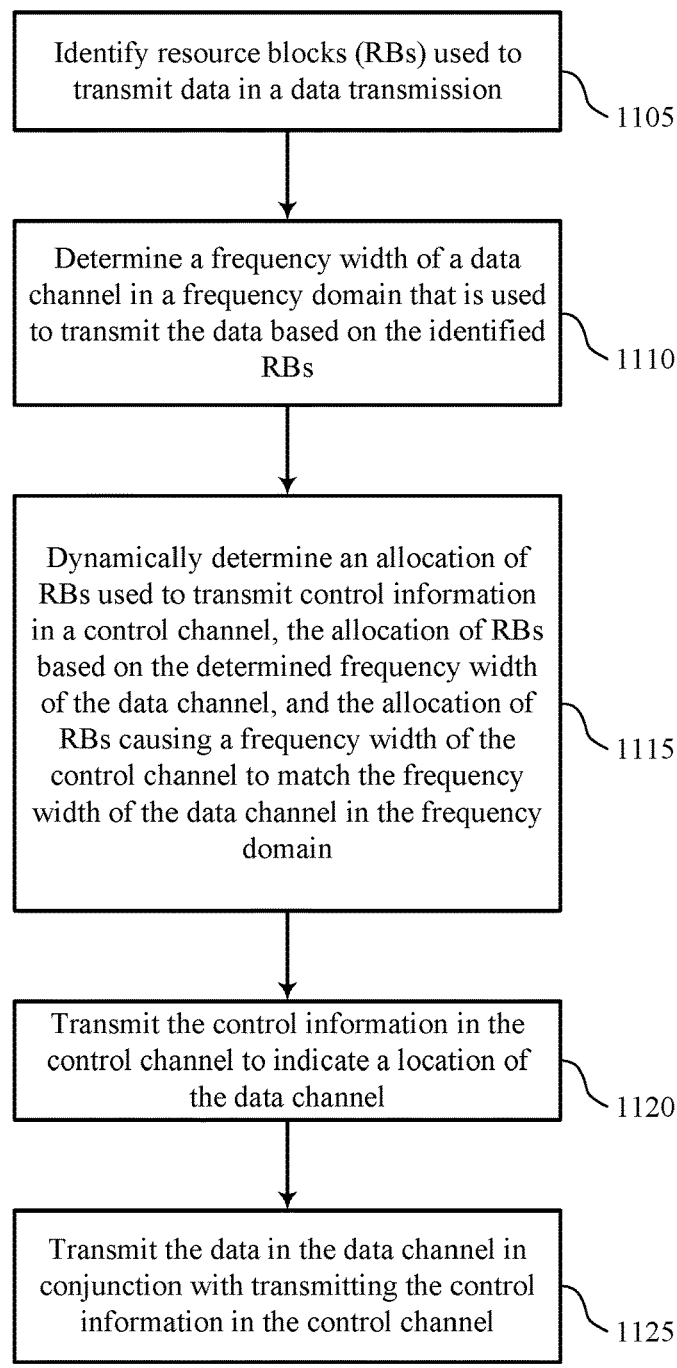

FIG. 11 shows a flowchart illustrating a method 1100 for V2X control channel design in accordance with various aspects of the present disclosure. The operations of method 1100 may be implemented by a UE 115 or base station 105 or its components as described herein. For example, the operations of method 1100 may be performed by a V2X control channel manager as described with reference to FIGS. 4 through 6. In some examples, a UE 115 or base station 105 may execute a set of codes to control the functional elements of the device to perform the functions described below. Additionally or alternatively, the UE 115 or base station 105 may perform aspects of the functions described below using special-purpose hardware.

At 1105, the UE 115 or base station 105 may identify RBs used to transmit data in a data transmission. The operations of 1105 may be performed according to the methods described with reference to FIGS. 1 through 3. In certain examples, aspects of the operations of 1105 may be performed by a data transmission RB manager as described with reference to FIGS. 4 through 6.

At 1110, the UE 115 or base station 105 may determine a frequency width of a data channel in a frequency domain that is used to transmit the data based at least in part on the identified RBs. The operations of 1110 may be performed according to the methods described with reference to FIGS. 1 through 3. In certain examples, aspects of the operations of 1110 may be performed by a data channel frequency width manager as described with reference to FIGS. 4 through 6.

At 1115, the UE 115 or base station 105 may dynamically determine an allocation of RBs used to transmit control information in a control channel, the allocation of RBs based at least in part on the determined frequency width of the data channel, and the allocation of RBs causing a frequency width of the control channel to match the frequency width of the data channel in the frequency domain. The operations of 1115 may be performed according to the methods described with reference to FIGS. 1 through 3. In certain examples, aspects of the operations of 1115 may be performed by a control information RB manager as described with reference to FIGS. 4 through 6.

At 1120, the UE 115 or base station 105 may transmit the control information in the control channel to indicate a location of the data channel. The operations of 1120 may be performed according to the methods described with reference to FIGS. 1 through 3. In certain examples, aspects of the operations of 1120 may be performed by a control information transmission manager as described with reference to FIGS. 4 through 6.

At 1125, the UE 115 or base station 105 may transmit the data in the data channel in conjunction with transmitting the control information in the control channel. The operations of 1125 may be performed according to the methods described with reference to FIGS. 1 through 3. In certain examples, aspects of the operations of 1125 may be performed by a data transmission manager as described with reference to FIGS. 4 through 6.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), OFDMA, single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM).

An orthogonal frequency division multiple access (OFDMA) system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are releases of Universal Mobile Telecommunications System (UMTS) that use E-UTRA. UTRA, E-UTRA, UMTS, LTE, LTE-A, NR, and Global System for Mobile communications (GSM) are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of eNBs provide coverage for various geographical regions. For example, each eNB, gNB or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), next generation NodeB (gNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communication system 100 of FIG.

1—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:
1. A method for wireless communication, comprising:
   identifying, by a transmitting device, resource blocks (RBs) used to transmit data in a data transmission;
   determining, by the transmitting device, a frequency width of a data channel in a frequency domain that is used to transmit the data and a number of RBs used to transmit the data transmission based at least in part on the identified RBs;
   dynamically determining, by the transmitting device, an allocation of RBs used to transmit control information in a control channel, the allocation of RBs based at least in part on the number of RBs used to transmit the data transmission and the determined frequency width of the data channel, such that a frequency width of the control channel is based on and matches the frequency width of the data channel in the frequency domain; and
   transmitting, by the transmitting device, the control information in the control channel to indicate a location of the data channel.

2. The method of claim 1, wherein dynamically determining the allocation of RBs further comprises:
repeating the control channel in the frequency domain.

3. The method of claim 2, further comprising:
repeating the control channel in time domain.

4. The method of claim 2, wherein a channel estimation of the control channel is performed based on a Listen Before Talk (LBT) sequence.

5. The method of claim 2, wherein repeating the control channel in the frequency domain causes the frequency width of the control channel to match the frequency width of the data channel in the frequency domain.

6. The method of claim 1, further comprising:
identifying a starting point and a length of the data transmitted in the data transmission; and
configuring the control information based at least in part on the starting point and the length of the data.

7. The method of claim 1, further comprising:
identifying a plurality of sub-channels used to transmit the data in the data transmission; and
dynamically determining the allocation of RBs used to transmit the control information based at least in part on the plurality of sub-channels.

8. The method of claim 1, wherein the allocation of RBs of the control channel comprises allocating a same number of allocated RBs used to transmit control information as a number of identified RBs used to transmit the data.

9. The method of claim 1, further comprising:
transmitting the data in the data channel in conjunction with transmitting the control information in the control channel.

10. The method of claim 9, wherein the control information comprises information bits configured according to the data transmission.

11. The method of claim 1, wherein the data transmission comprises a vehicle-to-everything (V2X) transmission or a vehicle-to-vehicle (V2V) transmission.

12. An apparatus for wireless communication, comprising:
means for identifying, by the apparatus, resource blocks (RBs) used to transmit data in a data transmission;
means for determining, by the apparatus, a frequency width of a data channel in a frequency domain that is used to transmit the data and a number of RBs used to transmit the data transmission based at least in part on the identified RBs;
means for dynamically determining, by the apparatus, an allocation of RBs used to transmit control information in a control channel, the allocation of RBs based at least in part on the number of RBs used to transmit the data transmission and the determined frequency width of the data channel, such that a frequency width of the control channel is based on and matches the frequency width of the data channel in the frequency domain; and
means for transmitting, by the apparatus, the control information in the control channel to indicate a location of the data channel.

13. An apparatus for wireless communication, in a system comprising:
a processor;
memory in electronic communication with the processor; and
the processor and memory configured to cause the apparatus to:
identify resource blocks (RBs) used to transmit data in a data transmission;
determine a frequency width of a data channel in a frequency domain that is used to transmit the data and a number of RBs used to transmit the data transmission based at least in part on the identified RBs;
dynamically determine an allocation of RBs used to transmit control information in a control channel, the allocation of RBs based at least in part on the number of RBs used to transmit the data transmission and the determined frequency width of the data channel, such that a frequency width of the control channel is based on and matches the frequency width of the data channel in the frequency domain; and
transmit the control information in the control channel to indicate a location of the data channel.

14. The apparatus of claim 13, wherein dynamically determining the allocation of RBs further comprises:
repeating the control channel in the frequency domain.

15. The apparatus of claim 14, wherein the processor and memory are further configured to cause the apparatus to:
repeat the control channel in time domain.

16. The apparatus of claim 14, wherein a channel estimation of the control channel is performed based on a Listen Before Talk (LBT) sequence.

17. The apparatus of claim 14, wherein repeating the control channel in the frequency domain causes the frequency width of the control channel to match the frequency width of the data channel in the frequency domain.

18. The apparatus of claim 13, wherein the processor and memory are further configured to cause the apparatus to:
identify a starting point and a length of the data transmitted in the data transmission; and
configure the control information based at least in part on the starting point and the length of the data.

19. The apparatus of claim 13, wherein the processor and memory are further configured to cause the apparatus to:
identify a plurality of sub-channels used to transmit the data in the data transmission; and
dynamically determine the allocation of RBs used to transmit the control information based at least in part on the plurality of sub-channels.

20. The apparatus of claim 13, wherein the allocation of RBs of the control channel comprises allocating a same number of allocated RBs used to transmit control information as a number of identified RBs used to transmit the data.

21. The apparatus of claim 13, wherein the processor and memory are further configured to cause the apparatus to:
transmit the data in the data channel in conjunction with transmitting the control information in the control channel.

22. The apparatus of claim 21, wherein the control information comprises information bits configured according to the data transmission.

23. The apparatus of claim 13, wherein the data transmission comprises a vehicle-to-everything (V2X) transmission or a vehicle-to-vehicle (V2V) transmission.

24. A non-transitory computer readable medium storing code for wireless communication, the code comprising instructions executable by a processor to:
identify resource blocks (RBs) used to transmit data in a data transmission;
determine a frequency width of a data channel in a frequency domain that is used to transmit the data and a number of RBs used to transmit the data transmission based at least in part on the identified RBs;
dynamically determine an allocation of RBs used to transmit control information in a control channel, the allocation of RBs based at least in part on the number of RBs used to transmit the data transmission and the determined frequency width of the data channel, such that a frequency width of the control channel is based on and matches the frequency width of the data channel in the frequency domain; and transmit the control information in the control channel to indicate a location of the data channel.

25. The non-transitory computer-readable medium of claim 24, wherein dynamically determining the allocation of RBs further comprises:

repeating the control channel in the frequency domain.

26. The non-transitory computer readable medium of claim 25, wherein the instructions are further executable by the processor to:

repeat the control channel in time domain.

27. The non-transitory computer readable medium of claim 25, wherein a channel estimation of the control channel is performed based on a Listen Before Talk (LBT) sequence.

28. The non-transitory computer-readable medium of claim 25, wherein repeating the control channel in the frequency domain causes the frequency width of the control channel to match the frequency width of the data channel in the frequency domain.

29. The non-transitory computer-readable medium of claim 24, wherein the instructions are further executable by the processor to:

identify a starting point and a length of the data transmitted in the data transmission; and configure the control information based at least in part on the starting point and the length of the data.

30. The non-transitory computer-readable medium of claim 24, wherein the instructions are further executable by the processor to:

identify a plurality of sub-channels used to transmit the data in the data transmission; and dynamically determine the allocation of RBs used to transmit the control information based at least in part on the plurality of sub-channels.

* * * * *